United States Patent
Flick et al.

(10) Patent No.: US 10,370,609 B2
(45) Date of Patent: Aug. 6, 2019

(54) METHOD FOR MAKING BIOMASS PELLETS

(71) Applicant: BRDC, LLC, Kingsville, MO (US)

(72) Inventors: Steve A. Flick, Kingsville, MO (US);
Kurt Herman, Brunswick, MO (US);
J. D. Dowell, Gallatin, MO (US)

(73) Assignee: BRDC, LLC, Kingsville, MO (US)

( * ) Notice: Subject to any disclaimer, the term of this patent is extended or adjusted under 35 U.S.C. 154(b) by 0 days.

(21) Appl. No.: 15/275,639

(22) Filed: Sep. 26, 2016

(65) Prior Publication Data
US 2017/0009167 A1 Jan. 12, 2017

Related U.S. Application Data

(63) Continuation of application No. 12/563,835, filed on Sep. 21, 2009, now Pat. No. 9,453,176.

(60) Provisional application No. 61/235,579, filed on Aug. 20, 2009.

(51) Int. Cl.
*C10L 5/44* (2006.01)
*C10L 5/36* (2006.01)

(52) U.S. Cl.
CPC ............ *C10L 5/445* (2013.01); *C10L 5/363* (2013.01); *C10L 5/44* (2013.01); *C10L 2200/0469* (2013.01); *C10L 2290/30* (2013.01); *Y02E 50/10* (2013.01); *Y02E 50/30* (2013.01)

(58) Field of Classification Search
USPC .......................................................... 44/589
See application file for complete search history.

(56) References Cited

U.S. PATENT DOCUMENTS

| | | | |
|---|---|---|---|
| 6,711,881 B1 | 3/2004 | McCracken et al. | |
| 2003/0070779 A1 | 4/2003 | Bransby | |
| 2007/0266623 A1* | 11/2007 | Paoluccio | C10B 53/02 |
| | | | 44/629 |
| 2008/0171297 A1* | 7/2008 | Reynolds | C10L 5/363 |
| | | | 432/1 |
| 2008/0280236 A1 | 11/2008 | Wright | |
| 2008/0295980 A1* | 12/2008 | Hallberg | B01D 3/002 |
| | | | 162/14 |
| 2009/0205546 A1 | 8/2009 | Kluko | |
| 2010/0146850 A1 | 6/2010 | Bexell | |
| 2010/0281767 A1 | 11/2010 | Zeeck | |

OTHER PUBLICATIONS

*Show Me Energy Cooperative Announces First Use of Biomass Pellets for Electrical Production in the United States*, RedOrbit NEWS, Jun. 17, 2008.
John Davis, *Biomass Pellets Making Electricity*, Domestic Fuel. com, Jun. 20, 2008.

(Continued)

*Primary Examiner* — Ellen M McAvoy
*Assistant Examiner* — Chantel L Graham
(74) *Attorney, Agent, or Firm* — Stinson LLP

(57) ABSTRACT

The present invention is directed to a process for forming biomass pellets using biomass feedstock having predetermined characteristics to form biomass pellets having desired characteristics. The process can utilize feedstock derived from a variety of biomass feedstock sources, including wood, agricultural crops, energy crops and weeds, alone or in combination.

13 Claims, 1 Drawing Sheet

(56) References Cited

OTHER PUBLICATIONS

Katie Micik, *Going green by going brown*, Columbia Missourian, Jan. 31, 2008.
Mina Mineva, *MU power plant replaces old boiler with biomass boiler*, Columbia Missourian, Apr. 16, 2009.
*Evergreen BioFuels USA Announces Agreement with Show Me Energy Cooperative to Engineer and Manage Largest Agro-Biomass Pellet Fuel Plant in North America*, Business Wire, Dec. 10, 2007.
E.M. Morrison, *Crop Stokin' Stoves: New stove fuel pellets are made from agricultural residues*, AG Innovation News, Oct.-Dec. 2005, vol. 14, No. 4.
Pamela A. Porter, et al., *Growing Wisconsin Energy: A Native Grass Pellet Bio-Heat Roadmap for Wisconsin*, Chapters 3 and 5, pp. 24-34 & 46-54, Agrecol Corporation, Jun. 2008.
Ken Campbell, *A Feasibility Study Guide for an Agricultural Biomass Pellet Company*, AURI AG Innovations, Chapters 10-13, pp. 27-85, St. Paul, Minnesota, Nov. 2007.
Joseph E. King, *Pellitzed Switchgrass for Space and Water Heating*, Kansas Corporation Commission, Sections 6.1.8 to 6.1.20, pp. 65-74, Sep. 1999.
As described in the attached *Exhibit A*, an experimental test was conducted on Jun. 12, 2008.

\* cited by examiner

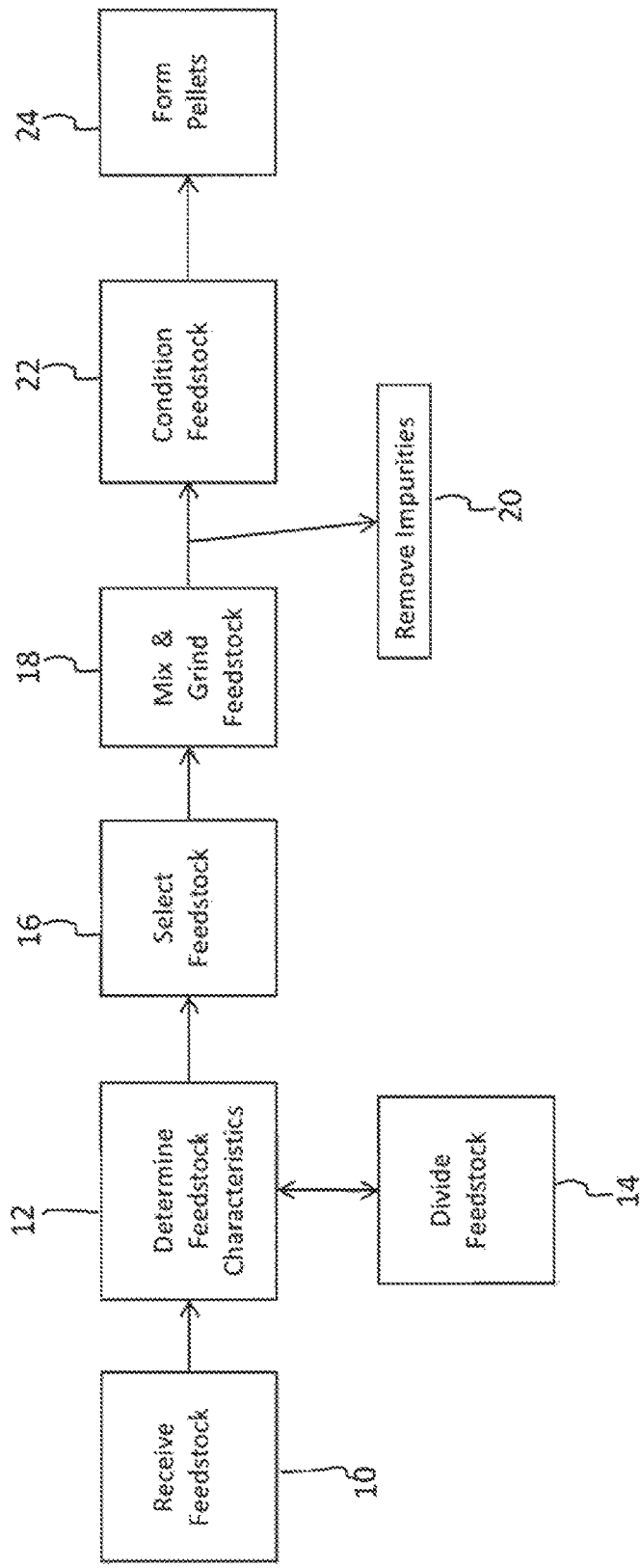

METHOD FOR MAKING BIOMASS PELLETS

CROSS-REFERENCE TO RELATED APPLICATIONS

This application is based on and claims priority to U.S. Provisional Application Ser. No. 61/235,579, filed on Aug. 20, 2009, and is a Continuation of U.S. patent application Ser. No. 12/563,835, filed on Sep. 21, 2009, which are hereby incorporated by reference in their entirety.

STATEMENT REGARDING FEDERALLY SPONSORED RESEARCH OR DEVELOPMENT

Not applicable.

BACKGROUND OF THE INVENTION

1. Field of the Invention

The present invention relates to a process for making biomass pellets, and more particularly to a process that is scalable for mass production using a variety of biomass feedstock sources.

2. Description of Related Art

Renewable energy sources can reduce dependence on fossil fuels, reduce greenhouse gas emissions, and create economic opportunities. Biomass is a plentiful renewable energy source and considerable research and development has been done on ways to economically convert raw biomass into a fuel source that can be used in place of traditional fossil fuels. Liquid biofuels, such as ethanol and biodiesel, are growing in use as transportation fuels. Wood is a renewable energy source that has be used as a heating fuel for thousands of years. More recently, wood waste products have been used to form wood pellets that can be used as a heating fuel. Wood pellets are extremely dense, can burn every efficiently and have a compact size and regular geometry. These characteristics contribute to ease in packaging, reasonable transportation costs, and ease in handling by automated feeding systems. However, wood takes a number of years to replenish and availability and cost of the waste wood supply is dependent on the underlying lumber and paper-making industries that produce the waste product.

Crop waste products, particularly corn, also have been used to form biomass fuel pellets. However, pellets formed from corn do not produce as much energy as wood pellets, and the availability and cost of the feedstock is dependent upon the underlying industry.

Other research efforts have focused on using switchgrass, an energy crop, to form biomass pellets. However, switchgrass lacks natural binding properties. As a result, even on small scale production lines, it is difficult to product switchgrass pellets with high density and durability.

BRIEF SUMMARY OF THE INVENTION

The present invention is directed to a process for forming biomass pellets using biomass feedstock having predetermined characteristics to form biomass pellets having desired characteristics. The process can utilize feedstock derived from a variety of biomass feedstock sources, including wood, agricultural crops, energy crops and weeds.

Specific characteristics of the feedstock are determined, including net energy values and moisture content, and the feedstock is divided into different fractions on the basis of such characteristics. These known characteristics are used to calculate the amounts of various feedstock fractions that must be selected to produce pellets having desired characteristics. These predetermined amounts of feedstock are selected from the various fractions, mixed and transferred to a hammer mill for grinding. Although pellets can be formed from a single feedstock fraction, in one exemplary embodiment, feedstock is selected from at least two fractions to produce pellets having desired characteristics. In one exemplary embodiment, pellets are made from feedstock comprising perennial grasses, other energy crops and weeds, combined with feedstock from wood and agricultural crop sources.

In one aspect of the invention, the feedstock is ground and mixed in a hammer mill at a specific speed to create a level of kinetic energy desired to heat the feedstock to a desired level for further processing. In another aspect of the invention, the ground feedstock is transferred from the hammer mill grinder to a holding bin using air streams, and impurities are removed from the airstream. A primary impurity that must be removed is $SiO_2$, which the inventors found will harm the pelleting equipment in large scale production environment.

In yet another aspect of the invention, the ground feedstock is conditioned prior to pellet formation using high temperatures, but without adding moisture or other conditioners. In another aspect of the invention, the die characteristics and extruding conditions are maximized for extrusion of pellets from a variety of biomass sources, including perennial grasses and other energy crops.

The process of the present invention is versatile in that it can utilize a variety of biomass materials as feedstock and can be scaled for commercial mass production of biomass pellets. In one exemplary embodiment, the entire process is automated and occurs as a semi-continuous process, with successive batches of feedstock processed on a continuous basis. This automated, semi-continuous process allows large scale commercial production that can process greater than 500 tons of feedstock per day, or over 100,000 tons of pellets per year.

The process conditions allow for use of high amounts of energy crops, having very high BTU values, which is difficult to achieve on a commercial scale due to difficulties in processing energy crops into pellets with desirable characteristics. Further, the process of the present invention can utilize a wide variety of biomass feedstock inputs without need for retooling. This allows optimal use of available feedstock sources, which significantly improves the sustainability of feedstock supply. In addition, biomass pellets with specific net energy values can be produced on a consistent basis. This allows for consistent energy outputs when used in energy production. Further, the inventors have discovered that there is a direct correlation between BTU values of pellets and the reduction of $CO_2$ emissions. By providing a process that allows use of feedstock having high net energy values, the resulting pellets have a significant impact in reducing the $CO_2$ offset as compared to fossil fuels, such as coal, or even other biomass pellets, such as wood, or single source biomass feedstock. Furthermore, the pellets of the present invention can be used in pellets stoves as a heat source, or can be combined with fossil fuels, such as coal, used to produce electricity, thus reducing the total amount of coal used.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

The present invention will be described in greater detail in the following detailed description of the invention with reference to the accompanying drawing that forms a part hereof, in which:

FIG. 1 is a process flow diagram of an exemplary embodiment of the present invention.

DETAILED DESCRIPTION OF EXEMPLARY EMBODIMENTS

While the invention will be described in detail herein below with reference to various exemplary embodiments, it should be understood that the invention is not limited to the specific configurations shown in these embodiments. Rather, one skilled in the art will appreciate that a variety of configurations may be implemented in accordance with the present invention.

An exemplary embodiment of the method for making biomass fuel pellets in accordance with the present invention will now be described with reference to the process flow diagram shown in FIG. 3. As represented by block 10, the feedstock is received from farmers, producers or other third parties. Feedstock may be received in various forms, including bales and loose material. In the exemplary embodiment, the loose feedstock material has a maximum particle size of ¾" or less.

Feedstock having suitable characteristics is derived from sustainable biomass feedstock, including feedstock sources containing lignin, hemi-cellulose and cellulose. The present invention can accommodate biomass feedstock from a variety of sources, including from wood, agricultural crops, dedicated energy crops and weeds. With respect to wood and agricultural crops, the feedstock is commonly agricultural residue, forestry residue and by-products, and ice and storm damaged wood. Dedicated energy crops are crops grown specifically for use as an energy source and include perennial grasses. In the exemplary embodiment, the feedstock is selected from one or more of the following sources: Switchgrass, such as CAVE-IN THE ROCK, ALAMO, KANLOW, BLACKWELL, NATIVE; INDIANGRASS, such as RUMSEY, OSAGE, NEBRASKA 54; BIG BLUESTEM such as KAW, ROUNDTREE; Broadleaf weeds, such as: LAMBS QUARTER, COCKLEBUR, PIGWEED, FOXTAIL, RAGWEED; grass straws such as KENTUCKY 31, FAWN TALL FESCUE, JOHNSONGRASS, SHATTERCANE, ANNUAL AND PERENNIAL RYEGRASS; CORNSTALKS; dedicated energy crops such as *MISCANTHUS GIGANTEUS*; Seed residue, including seed residue of FESCUE, RYE GRASSES, SWITCHGRASS, INDIANGRASS, BIG AND LITTLE BLUESTEM, and CANADIAN AND VIRGINIA WILDRYE.

As depicted in block 12, specific characteristics of the feedstock are determined, preferably including the net energy value, specific density and moisture content. A bomb calorimeter can be used to determine certain characteristics of the feedstock. In the exemplary embodiment, the feedstock has a net energy value between 6000 and 15,000, BTU/lb, preferably between 7100 and 8300 BTU/lb, and more preferably between 7500 and 8000 BTU/lb. The moisture content of the feedstock is preferably between 3 and 20%, more preferably between 3 and 15%, more preferably between 8 and 10%. The specific gravity is preferably between 4 and 15 lb/cu ft, more preferably between 6 and 10 lb/cu. ft. Feedstock outside of the preferred ranges may be rejected. In one exemplary embodiment, feedstock may be obtained from a third party that has already determined the characteristics of the feedstock.

If the feedstock is not to be used immediately, as represented by block 14, the feedstock is divided into fractions based on the characteristics of the feedstock, including net energy values and the type of feedstock. In one exemplary embodiment, the loose feedstock is divided into the following fractions, based on net energy values, for storage: Less than 8000 BTU/lb, 8001-9000 BTU/lb and over 9000 BTU/lb. Baled feedstock is stored in a storage facility wherein the bales are separated based on net energy values and the type of feedstock. During storage, the feedstock is dried with air from circulating ground floor air streams.

Prior to transferring feedstock from the storage location to the processing location, baled feedstock is processed into a processed baled feedstock fraction. In the exemplary embodiment, the baled feedstock is processed by grinding the bales by rotating the bales clockwise and counterclockwise into a hammer mill/grinder apparatus that defibers the feedstock using centripetal kinetic hammers. This allows the processing of a large number of round bales, up to 300 bales per day. In addition, round bales contain a sufficient amount of foreign matter, such as metal, unspent shot gun shells, wire and fencing materials, that is removed by air gaps and metal detectors throughout the output of the grinder. The grinding screen varies between 1 and 3 inches screen size.

If the feedstock has been stored, prior to transferring the feedstock from the storage location to the processing location, characteristics of the feedstock, including the energy value, moisture content and specific gravity for each loose fraction and processed bale fraction are again determined electronically, as represented in block 12. Preferably the feedstock characteristics are measured at least twice during a processing day.

Feedstock is selected for processing into pellets, as depicted in block 16. Predetermined amounts of feedstock are selected from the various fractions, including the processed bale fraction, based on the known characteristics of the fractions. In one exemplary embodiment, an amount of feedstock is first selected from the processed bale fraction and the known values of the processed bale fraction are used to determine how much and what types of feedstock are required from other fractions.

The predetermined amounts are calculated based on the known characteristics of the feedstock fractions and the desired characteristics of the resulting pellets. The desired characteristics of the resulting pellets and the types of feedstock used can be determined based on the desired use of the pellet and the desired and available biomass components. One formula that can be used to calculate the amounts of various feedstock fractions to be combined is: Cu. ft. feedstock/lbs.cu.ft.feedstock×lbs of feedstock/net energy per feedstock lbs.×moisture of feedstock/100.

In the exemplary embodiment, the process of determining the characteristics of the feedstock fractions, determining the required amounts of the various factions, selecting the amounts and transferring those amounts to the processing location is managed and performed using automated process controls, including an IPC system and related software. In one exemplary embodiment, predetermined amounts of feedstock are obtained using VFD controlled distribution. In yet another exemplary embodiment, the entire process through pellet formation is automated.

In the exemplary embodiment, the selected feedstock fractions are transported by conveyor to a rotor mixer and moved by air to a hammer mill grinder, for mixing and grinding as depicted in block 18. In the hammer mill grinder, the various feedstock fractions are ground to a reduced size. The blades of the grinder preferably operate at speeds of at least 1800 RPM, preferably 1750-2100 RPM. At such speeds, the grinder produces sufficient kinetic centripetal energy to heat the feedstock to 190-205 degrees F., or preferably to at least 200 degrees F., for further processing. The feedstock is preferably ground to a maximum particle size of 4 mm. In one exemplary embodiment, the particle size is between 1.2 and 3.2 mm.

The ground feedstock is moved to a holding bin, using ambient scrubbed air, preferably using suction. The preferred air speed is preferably between 1500 CFM and 5000 CFM and more preferably at least 2200 CFM.

As the feedstock is moved to the holding bin, impurities, such as $SiO_2$ are removed as depicted in block 20. Other impurities, including potassium, phosphorus, sodium, and chloride are also be removed. The impurities are removed through the transfer of the organic matter to exchange plates using anionic/cationic exchange. The impurities are collected in bins for possible reuse.

To condition the feedstock for pellet formation, as represented by block 22, the temperature of the feedstock in the holding bin is raised to and maintained at least 220 degrees F., or between 210 and 225 degrees F., using dry radiant heat. In the exemplary embodiment, the heat is provided by a circulating tube containing water and glycol. In one exemplary embodiment, no moisture or other additives are added to the feedstock. The moisture content is measured. Preferably the moisture content is between 11-15%, more preferably 12%. If the moisture level is too high, the feedstock may be dried prior to further processing. The heated feedstock is allowed to settle, preferably for three minutes, more preferably for at least two minutes, to allow an endothermic reaction to process the feedstock into a form suitable for extrusion.

The processed feedstock in then transferred to a pellet mill for pellet formation, which is represented by block 24. In one exemplary embodiment, the pellet die is operating at 150-175 degrees F. with the following dye size: I.D. 34 13/16", O.D. 42 13/16" widths, 13" overall die tract, 120 mm die, with thickness 4 of inches. The output rate in the exemplary embodiment is at least 2.4 lb/minute.

The extruded biomass material is cut into pellets having lengths between ¼ inch and ½ inch, more preferably ½ inch. The pellets are dried and screened to remove fines. The fine slave materials are routed back to the hammer mill for further reprocessing. Pellets made by the exemplary embodiment have a BTU value of at least 7200 BTU/lb, more preferably over 7500 BTU/lb and can consistently reach over 8000 BTU/lb.

The invention will be illustrated in terms of the following example:

A blend of 85% grass fiber, 10% wood, 5% seed residue having an average of 8,000 btu/lbs at 12% moisture was processed for final pelletization in 2.4 lbs/minute.

While the invention has been described in conjunction with various exemplary embodiments, other embodiments or configurations are contemplated by and within the scope of the present invention. The term "substantially" or "approximately" as used herein may be applied to modify any quantitative representation which could permissibly vary without resulting in a change in the basic function to which it is related.

While the present invention has been described and illustrated hereinabove with reference to various exemplary embodiments, it should be understood that various modifications could be made to these embodiments without departing from the scope of the invention. For example, it should be understood that the invention described herein includes numerous features that have been described in conjunction with the exemplary embodiment and examples. That those features may be arranged in various combinations, whether or not disclosed in a single embodiment herein, is contemplated by the present invention. Therefore, the invention is not to be limited to the exemplary embodiments described and illustrated hereinabove, except insofar as such limitations are included in the following claims.

What is claimed and desired to be secured by Letters Patent is as follows:

1. A method for selecting feedstock for making biomass pellets consistently having a predetermined net energy value and moisture content, comprising the steps of:
   obtaining biomass feedstock from a plurality of sources;
   after said obtaining step, testing the net energy values and moisture content of the biomass feedstock;
   dividing the biomass feedstock into biomass feedstock fractions based on the tested net energy value, and tested moisture content, wherein at least one tested feedstock fraction comprises at least two different feedstock components;
   retesting the net energy value and moisture content of one or more of the feedstock fractions, including at least one of said feedstock fractions comprising at least two different feedstock components;
   selecting biomass feedstock from at least one of said retested feedstock fractions based on the retested moisture content and retested net energy value in an amount to produce pellets having a predetermined net energy value and moisture content; and
   forming said feedstock into pellets, wherein said pellets consistently have a predetermined net energy value and moisture content resulting from the amounts of feedstocks selected from each feedstock fraction.

2. The method of claim 1, wherein said at least two different feedstock components are derived from biomass selected from the group consisting of wood, Switchgrass, INDIANGRASS, BIG BLUESTEM, Broadleaf weeds, grass straws, CORNSTALKS, dedicated energy crops, and seed residue.

3. The method of claim 1, wherein at least one retested feedstock fraction comprises feedstock derived from a dedicated energy crop.

4. The pellets formed by the method of claim 1.

5. The method of claim 1, wherein said selecting step comprises:
   selecting biomass feedstock from at least two of said feedstock fractions based on the retested moisture content and net energy value of each fraction.

6. The method of claim 5, wherein at least one of said two feedstock fractions comprises feedstock derived from biomass selected from the group consisting of wood, Switchgrass, INDIANGRASS, BIG BLUESTEM, Broadleaf weeds, grass straws, CORNSTALKS, dedicated energy crops, and seed residue.

7. The method of claim 5, wherein at least one of said two feedstock fractions comprises feedstock derived from dedicated energy crop.

8. The method of claim 7, wherein at least one of said two feedstock fractions comprises feedstock derived from biomass selected from the group consisting of wood and agricultural crops.

9. The pellet formed by the method of claim 5.

10. The method of claim 1, further comprising the step of retesting the net energy value and moisture content of one or more of the feedstock fractions after the process of forming the pellets has started.

11. A pellet formed by the process of claim 10.

12. The method of claim 1, wherein at least one of the two different feedstock components is unidentified at the time of testing, retesting and selection.

13. A pellet formed by the process of claim 12.

* * * * *